(12) United States Patent
Haimer et al.

(10) Patent No.: US 7,758,289 B2
(45) Date of Patent: Jul. 20, 2010

(54) DIAMETER-COMPENSATING BUSH FOR A TOOL HOLDER

(75) Inventors: Franz Haimer, Hollenbach-Igenhausen (DE); Josef Haimer, Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 554 days.

(21) Appl. No.: 11/628,281
(22) PCT Filed: May 30, 2005
(86) PCT No.: PCT/EP2005/005804

§ 371 (c)(1),
(2), (4) Date: Nov. 30, 2006

(87) PCT Pub. No.: WO2005/118189

PCT Pub. Date: Dec. 15, 2005

(65) Prior Publication Data

US 2008/0018061 A1    Jan. 24, 2008

(30) Foreign Application Priority Data

Jun. 1, 2004    (DE) ................... 10 2004 026 635

(51) Int. Cl.
*B23C 5/26* (2006.01)
*B23B 31/117* (2006.01)
*B23P 11/02* (2006.01)

(52) U.S. Cl. .............. 409/234; 279/143; 279/145; 279/46.2; 279/46.4; 279/48; 279/50; 279/52; 279/102; 29/447

(58) Field of Classification Search ............... 409/234, 409/232; 408/239 R, 239 A; 279/143, 145, 279/46.1, 46.2, 46.4, 48, 50, 52, 102, 103; 29/447

See application file for complete search history.

(56) References Cited

U.S. PATENT DOCUMENTS

| 2,478,195 | A | * | 8/1949 | Hull | 279/145 |
| 2,695,787 | A | * | 11/1954 | Sunnen | 279/46.5 |
| 5,316,324 | A | * | 5/1994 | Hufe, Jr. | 279/51 |
| 5,957,636 | A | * | 9/1999 | Boisvert | 409/232 |
| 6,260,858 | B1 | * | 7/2001 | DeLucia | 279/102 |
| 6,371,705 | B1 | * | 4/2002 | Gaudreau | 409/234 |
| 6,595,528 | B2 | * | 7/2003 | Voss | 279/102 |
| 6,726,223 | B2 | * | 4/2004 | Haimer | 279/103 |
| 6,887,019 | B1 | * | 5/2005 | Gerber | 409/234 |
| 7,137,185 | B2 | * | 11/2006 | Voss et al. | 29/447 |

* cited by examiner

*Primary Examiner*—Erica E Cadugan
(74) *Attorney, Agent, or Firm*—Edwards Angell Palmer & Dodge LLP; Scott D. Wofsy; Joshua L. Jones

(57) ABSTRACT

To compensate for tolerances and diameter differences during the chucking of a tool shank (15) in a tool holder (1) of the shrink-fit chuck type, a diameter-compensating bush (17) is provided. The diameter-compensating bush (17) has an outer sleeve (19) having a tapered inner circumferential surface (25) and an inner sleeve (21) arranged coaxially therein and having a tapered outer circumferential surface (27). Once the diameter-compensating bush (17) has been put onto the tool shank (15) and the inner sleeve (21) has been drawn into the outer sleeve (19), for example by means of a ring nut (35), for the diameter compensation, the outer sleeve (19) is thermally shrunk in place in the locating section (9) of the tool holder (1). In this way, rotary tools whose tool shank (15) does not have a diameter corresponding to the diameter or the tolerance requirements of the tool holder (1) can be chucked in a tool holder (1), for example, of the shrink-fit chuck type.

19 Claims, 2 Drawing Sheets

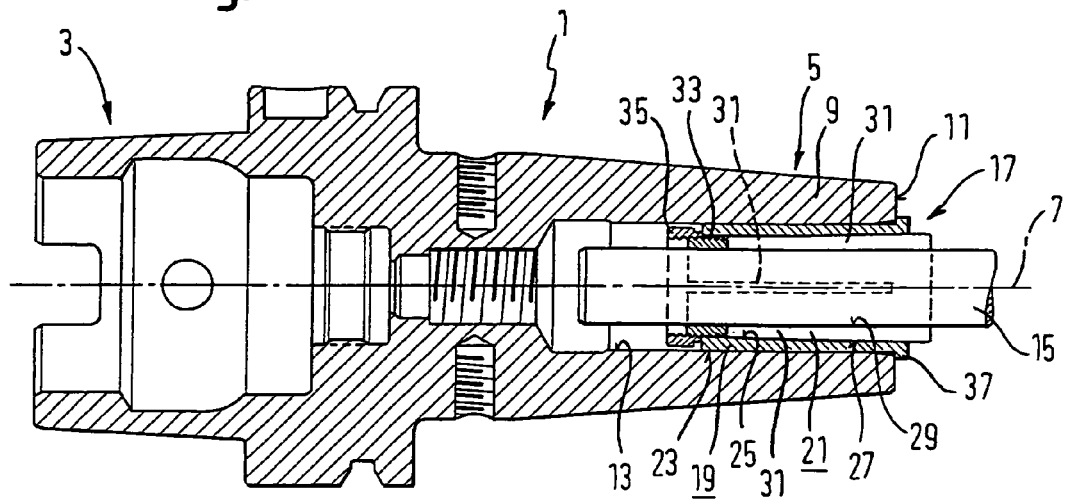
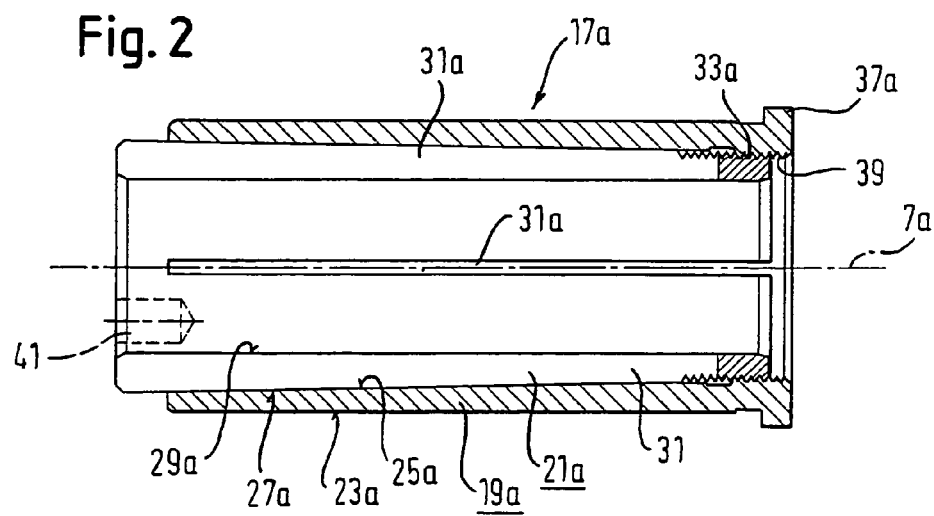
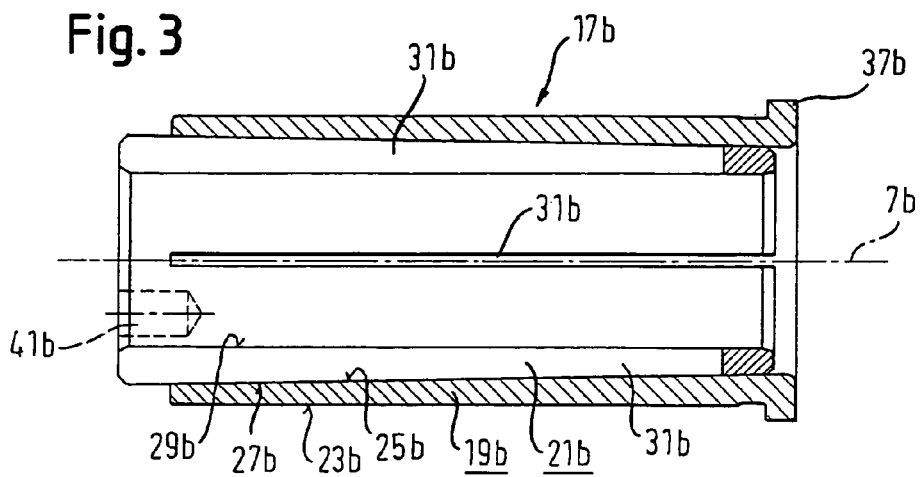

DIAMETER-COMPENSATING BUSH FOR A TOOL HOLDER

The invention relates to a diameter-compensating bush for a tool holder, in particular of the shrink-fit chuck type.

In practice, in order to chuck rotating tools, such as, for example, drills or milling cutters or the like, tool holders are often used whose chucking means holding the shank of the rotary tool in a radial interference fit have only slight maximum travel. The rule which applies is that the precision and the true-running accuracy of the tool holder is all the greater, the smaller the chucking travel is. Thus precision collet chucks have chucking travel of only a few millimeters, whereas other precision chucks, such as, for example, hydraulic expansion chucks with chucking means closed in a ring shape, but in particular tool holders of the shrink-fit chuck type are designed in such a way that rotary tools having only a single shank nominal diameter can be directly chucked in the tool holder. The consequence is that a multiplicity of tool holders have to be kept on hand for different shank diameters or else rotary tools having specifically designed tool shanks have to be used.

Tool holders of the shrink-fit chuck type hold the shank of the rotary tool, for example of a drill or milling cutter or the like, normally in an interference fit in a concentric locating opening of a sleeve-shaped locating section projecting coaxially to the rotation axis of the tool holder. By heating, for example by means of an inductive shrink-fitting apparatus, as disclosed, for example, by WO 01/89758 A1, the locating section can be expanded so that the shank of the rotary tool can be inserted into or removed from the locating opening. After the cooling, the locating section shrinks and exerts radial interference-fit forces directly on the shank of the rotary tool.

In order to obtain such an interference fit, the outside diameter of the shank of the rotary tool is slightly larger than the inside diameter of the locating opening. In order to be able to transmit sufficiently large interference-fit forces on the one hand, but in order to achieve sufficiently large expansion for the removal of the shank from the locating section during the heating on the other hand, the outside diameter of the shank must be adapted to the inside diameter of the locating opening within close tolerance limits. This normally requires very accurate machining of the tool shank, so that rotary tools often have to be prepared for use in a tool holder of the shrink-fit chuck type.

In a multiplicity of applications, it is also desired to be able to use rotary tools, such as screw taps or twist drills for example, in tool holders having slight chucking travel. This is not possible with conventional tool holders of the type explained above, in particular tool holders of the shrink-fit type, since such standard rotary tools usually have a shank diameter which does not correspond to the nominal diameter of the tool holders available or whose tolerances do not satisfy the chucking travel tolerances. The inside diameter of the locating opening of tool holders having slight chucking travel, such as, for example, of tool holders of the shrink-fit chuck type, is usually only graduated in relatively large diameter increments, such as, for example, 1 mm steps in the case of smaller diameters or 5 mm steps in the case of larger diameters. On the other hand, standard rotary tools, such as twist drills for example, have shank diameters which are graduated in accordance with the drill diameter in $\frac{1}{10}$ mm steps. Such standard drills cannot be used in conventional tool holders if a multiplicity of different tool holders are not kept on hand.

The object of the invention is to show a way in which the shank of a rotary tool can be chucked in a radial interference fit in a tool holder in an operationally reliable manner even when the nominal diameter or the diameter tolerance is not intended for chucking in this tool holder.

In this case, the invention is based on a tool holder whose locating section comprises chucking means which are intended for retaining a shank of a rotary tool concentrically to a rotation axis of the tool holder and define a locating opening for the shank, the chucking means being radially adjustable between a radially expanded release position for inserting or removing the shank and a chucking position in which the chucking means exert radial interference-fit forces on the shank.

According to the invention, for such a tool holder, a diameter-compensating bush is proposed which comprises two sleeves which are arranged coaxially one inside the other and of which the outer sleeve has a cylindrical outer surface and a tapered inner surface and of which the inner sleeve has a tapered outer surface, bearing against the tapered inner surface of the outer sleeve, and a cylindrical inner surface, the inside diameter of which can be changed for the diameter compensation by axial displacement of the inner sleeve and the outer sleeve relative to one another until the inner surface of the inner sleeve bears against the outer surface of the shank. In this case, the outside diameter of the outer sleeve is less than the inside diameter of the locating opening in the release position of the chucking means, and the diameter-compensating bush can be inserted into or removed from the locating opening in the release position of the chucking means and transmits the interference-fit forces to the shank in the chucking position of the chucking means.

The invention is based on the idea of not chucking the rotary tool in a tool holder with an inside diameter of its locating opening adapted to the nominal diameter of the tool shank, but instead of using a tool holder having a larger inside diameter and of adapting the inside diameter in a variable manner to the nominal diameter of the tool shank by means of the diameter-compensating bush. By means of a diameter-compensating bush according to the invention, diameter differences between the nominal diameter of the tool shank and the inside diameter of the tool holder up to a few millimeters, including any diameter tolerances present, can be compensated for in an infinitely variable manner. In this way, twist drills graduated, for example, in $\frac{1}{10}$ mm diameter increments can be used in tool holders whose locating openings are graduated in 1 mm steps.

Since, by axial displacement of the inner sleeve and the outer sleeve relative to one another, radial play between the diameter-compensating bush and the tool shank is already compensated for before the tool shank is chucked in place in the tool holder, it is ensured that the diameter-compensating bush transmits the interference-fit forces exerted by the chucking means of the locating section to the tool shank even in the case of small maximum travel of the chucking means. In the process, the diameter-compensating bush is radially contracted in an elastic manner. Since the actual interference-fit forces are exerted by the locating section, the diameter-compensating bush, taken on its own, need not be chucked radially in a torque-transmitting manner like a collet. It is sufficient for the inner and the outer sleeve to be displaced axially relative to one another to such an extent that any play between the inner sleeve and the tool holder is compensated for. The wall thicknesses of the inner sleeve and of the outer sleeve can therefore be dimensioned to be comparatively small, which facilitates the transmission of the interference-fit forces from the locating section to the tool shank.

In a preferred configuration, the inner sleeve has at least one axially extending compensating seam, but preferably a plurality of axially extending compensating seams distributed in the circumferential direction. The compensating seams facilitate the diameter change of the inner sleeve for the diameter compensation. In particular if a plurality of compensating seams arranged in a distributed manner in the circumferential direction, for example four or six compensating seams arranged at equal distances apart in the circumferential direction, are provided, the transmission of the interference-fit forces is also improved, since the inner sleeve conforms more uniformly to the circumference of the tool shank.

At least some of the compensating seams may be designed as axially extending grooves. The bases of the grooves provide for a closed lateral surface of the sleeve wall and make twisting of the inner sleeve more difficult, which benefits the precision of the chucking operation. The grooves are preferably provided in the outer surface of the inner sleeve, so that the inner circumference of the sleeve is unimpaired and available for the transmission of the interference-fit forces.

The compensating seams may also be slots which pass radially through the inner sleeve. Slots have the advantage that they can absorb diameter changes of the inner sleeve in an especially effective manner. It has proved to be expedient if at least one of the compensating seams is designed as a slot, whereas the rest of the compensating seams of the inner sleeve are designed as grooves, as explained above. Such a sleeve conforms to the outer circumference of the tool shank in an especially effective manner.

In order to increase the torsional rigidity of the inner sleeve and thus the chucking precision of the tolerance-compensating bush overall, provision is preferably made for the axial length of the compensating seams to be less than the axial length of the inner sleeve, and for the compensating seams to start alternately in the circumferential direction from the one and the other axial end of the inner sleeve.

The taper angle of the two sleeves is expediently selected in such a way that the two sleeves can be connected to one another in a self-locking manner in the axial direction. Taper angles of 1° to 5°, for example, are suitable.

In a self-locking design of the tapered surfaces of the sleeves, it is sufficient for the diameter compensation if the two sleeves are driven axially one inside the other with a relatively small force. In a preferred configuration, however, the inner sleeve has an external thread, with which it can be screwed into an internal thread of the outer sleeve. Such a screwed connection facilitates the chucking and release of the diameter-compensating bush. Alternatively, a nut or the like which is supported on the outer sleeve can be screwed onto the external thread of the inner sleeve. Such a configuration has the advantage that the inner sleeve need not rotate relative to the tool shank during the screwing.

On one of its axial ends, the outer sleeve preferably has a radially outwardly projecting stop for limiting the insertion depth relative to the locating section of the tool holder. Such a stop, which may be a radially outwardly projecting annular flange or the like, fixes the diameter-compensating bush in a predetermined axial position relative to the locating section, a factor which has a favorable effect on the release behavior of the tool holder.

The outer sleeve may have a closed circumferential wall, a factor which promotes the torsional rigidity of the outer sleeve but reduces the radial interference-fit forces which can be transmitted to the inner sleeve and thus to the tool shank. In order to prevent some of the chucking forces applied by the chucking means from being used up for the deformation of the outer sleeve, provision is made in a preferred configuration for the outer sleeve to have at least one axially extending compensating seam, but preferably a plurality of such compensating seams distributed in the circumferential direction. The compensating seams may again be axially extending grooves or slots passing radially through the outer sleeve. The compensating seams expediently end at an axial distance from at least one axial end of the outer sleeve and preferably at an axial distance from both axial ends in order to prevent the outer sleeve from expanding to an excessive degree during the restraining of the inner sleeve and from no longer fitting into the locating opening of the tool holder. It has also proved to be expedient if, in the region of at least one of the two axial ends of the outer sleeve, but preferably in the region of both axial ends of the outer sleeve, the outside diameter of the outer sleeve axially between the axial end of the sleeve and the end of the compensating seams which is axially adjacent thereto is smaller than in the region of the compensating seams. The outer sleeve thus transmits the chucking force of the chucking means solely in its region provided with compensating seams and thus essentially without loss of chucking force.

From a further aspect, the invention also relates to a tool holder arrangement consisting of a tool holder, in particular of the shrink-fit chuck type, and a diameter-compensating bush of the type explained above.

Exemplary embodiments of the invention are explained in more detail below with reference to a drawing, in which:

FIG. 1 shows an axial longitudinal section through a tool holder of the shrink-fit chuck type with a diameter-compensating bush, holding the shank of a rotary tool, according to the invention;

FIG. 2 shows an axial longitudinal section through a first variant of the diameter-compensating bush;

FIG. 3 shows an axial longitudinal section through a second variant of the diameter-compensating bush;

Figure 4:
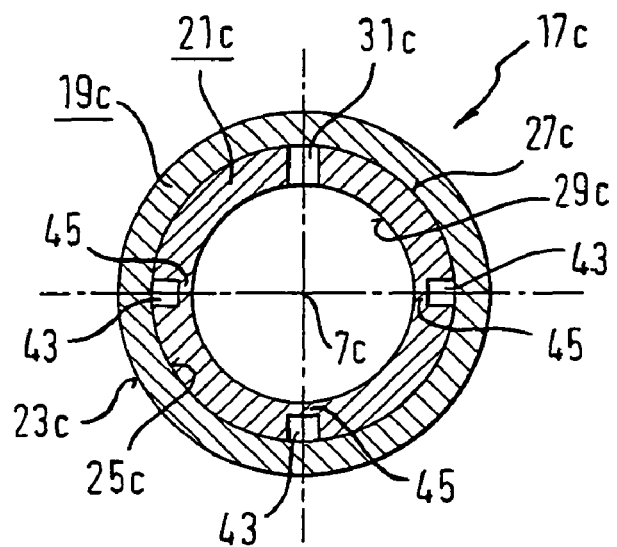
FIG. 4 shows an axial cross section through a preferred modification of the diameter-compensating bush of FIGS. 1 to 3.

FIG. 1 shows a tool holder 1 of the shrink-fit chuck type with a coupling section 3, here in the form of a hollow-shank taper (HSK) for the rotationally fixed coupling to a work spindle of a machine tool, at its one axial end and a locating section 5 at its other axial end. The rotation axis of the tool holder 1 is shown at 7. The coupling section 3 may be of any desired form, that is to say it may have the shape of a steep-angle taper or the like. The locating section 5 has the basic shape of a sleeve 9 which ends in an end face 11 running perpendicularly to the rotation axis 7 and contains a cylindrical locating opening 13 which is concentric to the rotation axis 7 and in which a rotary tool (not shown in any more detail) interchangeably engages with its tool shank 15 in a manner described in more detail below. In this case, the tool shank 15 sits in a diameter-compensating bush which is generally designated by 17 and which in turn, in a manner described in more detail below, is arranged in the locating opening 13 in a removable manner and transmits interference-fit forces produced by the locating section 9 radially to the tool shank 15.

The diameter-compensating bush 17 has two sleeves 19, 21 which are arranged coaxially one inside the other and of which the outer sleeve 19 has a cylindrical outer surface 23 and a tapered inner surface 25. The inner sleeve 21 has a tapered outer surface 27, intended for bearing against the tapered inner surface 25 of the outer sleeve 19, and a cylindrical inner surface 29, the inside diameter of which can be changed by axial displacement of the inner sleeve 21 relative to the outer sleeve 19 along the tapered surfaces 25, 27. In order to be able to change the inside diameter of the inner sleeve 21 with the smallest possible axial expenditure of force, the inner sleeve 21 has a plurality of axial compensating seams which are arranged at equal angular distances from one another in a distributed manner over its circumference and are in the form of axial slots 31 which pass through the wall of the sleeve 21 and are shorter in the axial direction than the axial length of the inner sleeve 21. The slots start alternately in the circumferential direction from axially opposite ends of the inner sleeve 21. The sleeve 21 accordingly has a meander-shaped wall structure. In the exemplary embodiment shown, the inner sleeve 21 has four slots 31 which follow one another in the circumferential direction at equal angular distances apart. However, there may also be more or fewer slots. In principle, it is sufficient for the inner sleeve 21 to have a single slot, which, however, then passes axially completely through the sleeve 21.

At its end of smaller diameter, the inner sleeve 21 projects axially beyond the outer sleeve 19 and has at this end an external thread 33, onto which a ring nut 35 is screwed. The ring nut 35 is supported on the adjacent end of the outer sleeve 19 and allows the inner sleeve 21 to be drawn into the outer sleeve 19 with the inner circumferential surface 29 being reduced in diameter.

The diameter-compensating bush 17 bridges the diameter difference between the outside diameter of the tool shank 15 and the inside diameter of the locating opening 13 and enables diameter tolerances of the tool shank 15 to be compensated for and also permits the adaptation to outside diameters of the tool shank 15 which differ within a diameter range predetermined by the travel of the diameter-compensating bush 17. To this end, the diameter-compensating bush 17 is first of all pushed onto the tool shank 15 and then the ring nut 35 is tightened until the inner sleeve 21 bears free of play against the circumferential surface of the shank 15, but without exerting interference-fit forces on the tool shank to an appreciable extent.

The outside diameter of the outer circumferential surface 23 of the outer sleeve 19 closed in a ring shape is dimensioned to be slightly larger than the inside diameter of the locating opening 13. During the heating of the locating section 9, for example by means of an inductive shrink-fitting apparatus of the type described in WO 01/89758 A1, the locating opening 13 expands to such an extent that the diameter-compensating bush 17 arranged on the tool shank 15 free of play can be inserted into the thermally expanded locating opening 13. An annular stop collar 37 on the tool-side end of the outer sleeve 19 limits the insertion depth by striking the end face 11 of the locating section 9. After the cooling, the locating section 9, which is thus shrinking, exerts radial interference-fit forces on the outer sleeve 19, which are transmitted via the inner sleeve 21 to the tool shank 15 and fix the latter as a whole in a rotationally fixed manner in an interference fit in the locating section 9. In order to be able to release the tool shank 15 again from the tool holder 1, the locating section 9 is heated again until it releases the diameter-compensating bush 17, so that the tool shank 15 together with the diameter-compensating bush 17 can be pulled out of the locating opening 13. The tolerances of the outside diameter of the outer sleeve 19 are selected in such a way that this operation can be carried out essentially without jamming.

Variants of the diameter-compensating bush which can be used in a tool holder according to FIG. 1 are explained below. Components corresponding to one another or having the same effect are designated by the reference numerals in FIG. 1 and are provided with a letter for differentiation. To explain the construction and the functioning, reference is made to the above description.

The diameter-compensating bush 17a of FIG. 2 differs from the diameter-compensating bush 17 of FIG. 1 essentially only by the fact that the external thread 33a provided on that end of the inner sleeve 21a which is smaller in diameter is screwed directly into an internal thread 39 on the adjacent end of the outer sleeve 19a. In this case, the inner sleeve 21a tapers toward the tool side of the tool shank (not shown in any more detail), that is to say toward that end of the outer sleeve 19a which is provided with the stop collar 37a. At the axially opposite end, the inner sleeve 21a is provided with manipulating surfaces, here in the form of insertion holes 41 for a turning tool which can be put on for chucking the diameter-compensating bush 17a. FIG. 2 only shows one of the holes 41. The inner sleeve 21a is again provided with compensating seams in the form of slots 31a, which extend alternately in the circumferential direction from the axially opposite ends of the inner sleeve 21a in the axial direction over part of the axial length of the inner sleeve 21a.

FIG. 3 shows a diameter-compensating bush 17b which differs from the variants in FIGS. 1 and 2 essentially only by the fact that the inner sleeve 21b is fixed in the outer sleeve 19b solely on account of the self locking between its tapered outer circumferential surface 27b and the tapered inner circumferential surface 25b of the outer sleeve 19b. The taper angle of the circumferential surfaces 25b and 27b lies between 1° and 5°, so that the inner sleeve 21b can be pressed in axially in a force fit in the outer sleeve 19b by an axial force exerted on its end of larger diameter. In order to be able to facilitate the driving-in and if need be the subsequent loosening of the inner sleeve 21b, application surfaces 41b for a tool may again be provided on the end of larger diameter.

In the configurations of the diameter-compensating bush which are explained above, the inner sleeve is in each case provided with slots (for example 31 in FIG. 1) passing radially through its wall. FIG. 4 shows a variant of the diameter-compensating bush in which only a single slot 31c extending axially along the sleeve and passing through its wall is provided, whereas the rest of the compensating seams provided in the circumferential direction of the inner sleeve 21c are designed as axially extending grooves 43. The grooves 43 are incorporated in the tapered outer circumference 27c of the inner sleeve 21c and have bases 45 defined by the cylindrical inner circumference 29c. Here, too, the compensating seams formed by the slot 31c and the grooves 43 do not extend over the entire axial length of the inner sleeve 21c, but start alternately in the circumferential direction from axially opposite ends of the inner sleeve 21c, as explained in connection with the example having the slots 31 in FIG. 1. The diameter-compensating bush 17c is especially torsionally rigid and conforms to the circumference of the tool shank even when a slight axial force is acting.

It goes without saying that, instead of a single slot 31c, a plurality of slots may also be provided in addition to the grooves 43. The variant in FIG. 4 may be provided instead of the slots of the diameter-compensating bushes in FIGS. 1 to 3 explained above.

Figure 5:
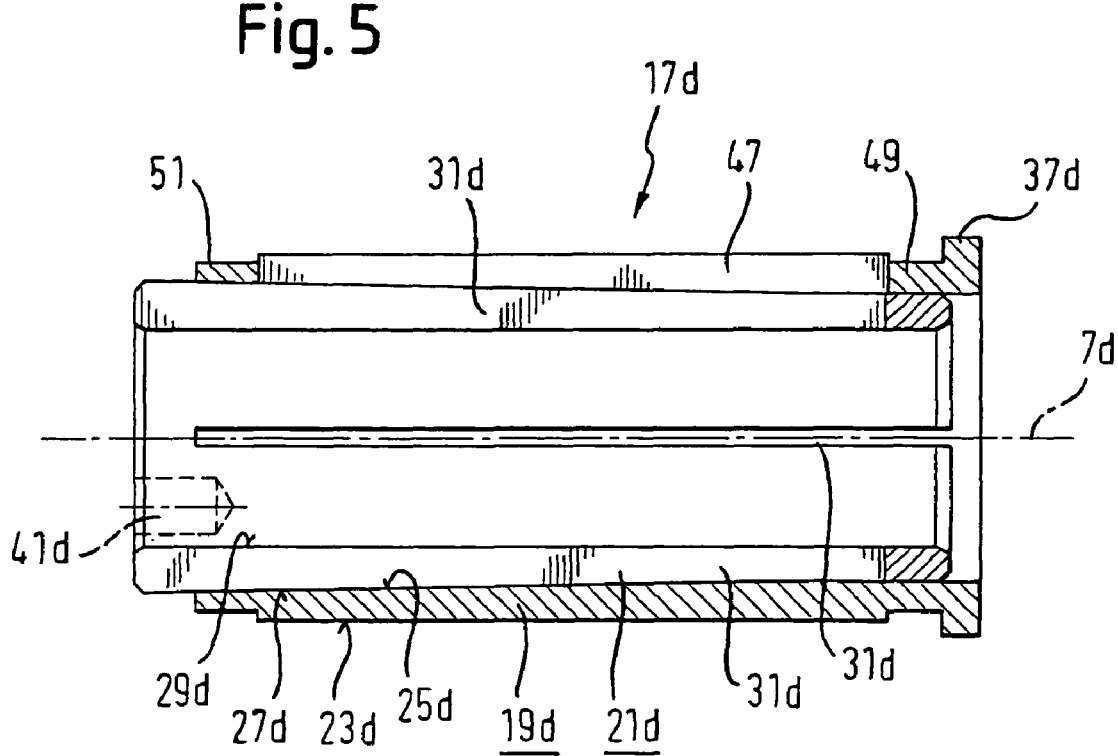
FIG. 5 shows an axial longitudinal section through a third variant of the diameter-compensating bush.

In the variants of the diameter-compensating bush which are explained with reference to FIGS. 1 to 4, the outer sleeve, for example the outer sleeve 19 in FIG. 1, is in each case designed as a sleeve which is closed in a ring shape and is free of apertures. A sleeve of this type uses up some of the chucking force during the chucking of the tool. FIG. 5 shows a variant of a diameter-compensating bush 17d which is similar to the diameter-compensating bush 17b in FIG. 3 and which differs from this variant essentially only by the fact that the outer sleeve 19*d* contains a plurality of axially elongated slots 47 distributed over the circumference and passing radially through the sleeve 19*d*. FIG. 5 shows only one of these slots 47. In order to prevent the outside diameter of the outer sleeve 19*d* from being excessively expanded during the chucking, which narrows the inner sleeve 21*d*, of the diameter-compensating bush 17*d*, so that the diameter-compensating bush 17*d* mounted on the tool shank possibly no longer fits into the locating opening 13 of the tool holder 1 shown in FIG. 1, the slots 47 end axially on both sides at a distance from the end faces of the outer sleeve 19*d*, with end regions 49, 51 closed in a ring shape being formed. The outside diameter of the end regions 49, 51 is selected to be slightly smaller than the outside diameter of the outer circumferential surface 23*d*, provided with the slots 47, of the outer sleeve 19*d*. In this way, the radial chucking forces exerted on the diameter-compensating bush 17*d* act solely on the center region provided with the slots 47, so that the radial chucking forces can be transmitted to the tool shank virtually without losses.

It goes without saying that the slots 47, if need be, may also pass through at a respective end up to the end face of the outer sleeve 19*d*, as explained above for the inner sleeve. The end regions 49 or/and 51 may also be dimensioned so as to have the same diameter as the center region, forming the slots 47, of the outer sleeve 19*d*.

Instead of the slots 47, grooves may also be provided, as explained in connection with FIG. 4 at 43.

The configuration of the outer sleeve explained above with reference to FIG. 5 can also be realized in the variants of the diameter-compensating bush which are explained with reference to FIGS. 1 to 4.

The diameter-compensating bush has been explained above in connection with a tool holder of the shrink-fit chuck type. It goes without saying that the diameter-compensating bush may also be used in other types of chuck having comparatively small effective chucking travel, such as, for example, hydraulic expansion chucks, or mechanical chucks with chucking means closed in a ring shape, or precision collet chucks with small chucking travel. In particular, the diameter-compensating bush can be advantageously used in chucks which are used only for chucking tool shanks having a single nominal diameter.

The invention claimed is:

1. A tool holder for a rotary tool, comprising:
   a) a mounting section for holding a shaft of the rotary tool centrally relative to an axis of rotation of the tool holder;
   b) a diameter compensation bush held detachably in a mounting opening of the mounting section for bridging a diameter difference between an internal diameter of the mounting opening and an external diameter of the shaft, wherein the diameter compensation bush includes two sleeves arranged coaxially one inside another, of which an external sleeve has a cylindrical external surface and a conical inner surface and of which an inner sleeve has a conical external surface bearing against the conical inner surface of the external sleeve and a cylindrical inner surface having an internal diameter that can be changed for diameter compensation by axial displacement of the inner sleeve and the external sleeve relative to one another down to a diameter allowing bearing of the inner surface of the inner sleeve against the external surface of the shaft; and
   c) clamping means provided on the mounting section, which define the mounting opening and are radially adjustable between a radially widened release position for inserting or removing the diameter compensation bush and a clamping position, in which the clamping means exert radial press-fit forces on the diameter compensation bush, wherein the external diameter of the external sleeve is smaller than the internal diameter of the mounting opening in the release position of the clamping means so that the diameter compensation bush in the release position of the clamping means can be inserted into the mounting opening or removed therefrom, wherein the diameter compensation bush transmits to the inner sleeve the radial press-fit forces, which are exerted in the clamped position on the external sleeve, for press-fit holding of the shaft on the mounting section.

2. A tool holder for a rotary tool as recited in claim 1, wherein the inner sleeve has at least one axially extending compensating seam.

3. A tool holder for a rotary tool as recited in claim 2, wherein the at least one compensating seam comprises a plurality of compensating seams, and wherein at least some of the compensating seams are designed as axially extending grooves.

4. A tool holder for a rotary tool as recited in claim 3, wherein the grooves are provided in the external surface of the inner sleeve.

5. A tool holder for a rotary tool as recited in claim 1, wherein the inner sleeve has a plurality of axially extending compensating seams distributed in a circumferential direction around the inner sleeve.

6. A tool holder for a rotary tool as recited in claim 5, wherein at least one of the compensating seams is designed as a slot passing radially through the inner sleeve.

7. A tool holder for a rotary tool as recited in claim 5, wherein the compensating seams have an axial length that is less than that of the inner sleeve, and the compensating seams start alternately in the circumferential direction from opposite axial ends of the inner sleeve.

8. A tool holder for a rotary tool as recited in claim 1, wherein the taper angle of the two sleeves is selected in such a way that the two sleeves can be connected to one another in a self-locking manner in the axial direction.

9. A tool holder for a rotary tool as recited in claim 1, wherein the inner sleeve has an external thread, with which it can be screwed into an internal thread of the external sleeve.

10. A tool holder for a rotary tool as recited in claim 1, wherein the inner sleeve has an external thread, onto which a nut which can be supported on the external sleeve is screwed.

11. A tool holder for a rotary tool as recited in claim 1, wherein, at one of its axial ends, the external sleeve has a radially outwardly projecting stop for limiting insertion depth of the external sleeve relative to the mounting section.

12. A tool holder for a rotary tool as recited in claim 1, wherein the external sleeve has at least one axially extending compensating seam.

13. A tool holder for a rotary tool as recited in claim 12, wherein the at least one compensating seam comprises a plurality of compensating seams, and wherein at least some of the compensating seams are designed as axially extending grooves or as slots passing radially through the external sleeve.

14. A tool holder for a rotary tool as recited in claim 12, wherein the at least one compensating seam comprises a plurality of compensating seams, and wherein the compensating seams end at an axial distance from at least one axial end of the external sleeve.

15. A tool holder for a rotary tool as recited in claim 14, wherein, in the region of at least one of the two axial ends of the external sleeve, the outside diameter of the external sleeve axially between the axial end of the sleeve and the end of the compensating seams which is axially adjacent thereto is smaller than in the region of the compensating seams.

16. A tool holder for a rotary tool as recited in claim 1, wherein the mounting section of the tool holder is dimensioned for directly chucking rotary tools having a single shank nominal diameter.

17. A tool holder for a rotary tool as recited in claim 1, wherein the clamping means includes a sleeve portion which contains the mounting opening and can be expanded by heating for insertion or removal of the diameter compensation bush, and wherein, when the diameter compensation bush is not inserted, the outside diameter of the external sleeve of the diameter compensation bush is greater than the inside diameter of the mounting opening of the mounting section in a cooled state and exerts interference-fit forces on the external sleeve after cooling of the mounting section.

18. A method of mounting a tool in a tool holder comprising:
  a) preparing a tool holder to hold a rotary tool, the tool holder including chucking means that define a locating opening and that are radially adjustable between a radially expanded release position and a chucking position for exerting radial interference fit forces on the tool, wherein the step of preparing the tool holder includes expanding the chucking means of the tool holder to the radially expanded release position;
  b) preparing a diameter-compensating bush to hold the rotary tool in the tool holder, the diameter-compensating bush having an outer sleeve and an inner sleeve arranged coaxially with and radially inward of the outer sleeve, the outer sleeve having a cylindrical external surface and a conical inner surface, the inner sleeve having a conical external surface bearing against the conical inner surface of the outer sleeve and a cylindrical inner surface having an internal diameter which can be changed for diameter compensation by axial displacement of the inner sleeve and the outer sleeve relative to one another down to a diameter allowing the inner surface of the inner sleeve to bear against an external surface of a shank of the rotary tool, the step of preparing the diameter-compensating bush including mounting a shank of the rotary tool within the cylindrical inner surface of the diameter compensating bush; and
  c) mounting the diameter-compensating bush and rotary tool in the tool holder by inserting the diameter-compensating bush through the locating opening into the chucking means in the release position and placing the chucking means of the tool holder into the chucking position with the chucking means pressed onto the cylindrical external surface of the diameter-compensating bush to exert radial interference-fit forces on the diameter-compensating bush and on the shank of the rotary tool.

19. A diameter-compensating bush for holding a tool in a tool holder, the diameter-compensating bush comprising two sleeves arranged coaxially one inside another, of which an outer sleeve has a cylindrical external surface and a conical inner surface and of which an inner sleeve has a conical external surface bearing against the conical inner surface of the outer sleeve, and a cylindrical inner surface, an internal diameter of which is configured to be changed for diameter compensation by axial displacement of the inner sleeve and the outer sleeve relative to one another down to a diameter allowing bearing of the inner surface of the inner sleeve against an external surface of a shank of a rotary tool, wherein the diameter-compensating bush is configured and adapted to be held detachably in a locating opening of a locating section of a tool holder for bridging a diameter difference between an internal diameter of the locating opening and an external diameter of a shank of a rotary tool, and to hold the shank in the locating section centrally relative to an axis of rotation of the tool holder, wherein the diameter-compensating bush transmits to the inner sleeve radial interference-fit forces exerted on the outer sleeve by the locating section of the tool holder, for interference-fit holding of the shank of the rotary tool on the locating section of the tool holder.

\* \* \* \* \*